United States Patent [19]

Schneider et al.

[11] Patent Number: 5,055,651
[45] Date of Patent: Oct. 8, 1991

[54] INTERFERENCE SHIELD SUITABLE FOR USE IN AUTOMATED MANUFACTURING ENVIRONMENT

[75] Inventors: Robert B. Schneider, Hypoluxo; Nadim Halabi, Sunrise; Daniel Peana, Boca Raton, all of Fla.

[73] Assignee: Motorola, Inc., Schaumburg, Ill.

[21] Appl. No.: 561,388

[22] Filed: Aug. 1, 1990

[51] Int. Cl.⁵ .................. B23K 26/00; B23K 26/02; H01P 1/00; H05K 9/00
[52] U.S. Cl. .................. 219/121.68; 219/121.62; 219/121.83; 333/248; 333/252; 174/35 R
[58] Field of Search .......... 174/35 MS, 35 GC, 35 R; 219/10.55 D, 10.55 R, 121.19, 121.68, 121.6, 121.61, 121.62, 121.69, 121.83, 121.85; 361/424; 333/208, 186, 239, 248, 252

[56] References Cited

U.S. PATENT DOCUMENTS

| | | | |
|---|---|---|---|
| 4,010,343 | 3/1988 | Tanaka et al. | 219/10.55 D |
| 4,412,255 | 10/1983 | Kuhlman et al. | 358/245 |
| 4,613,530 | 9/1986 | Hood et al. | 428/34 |
| 4,631,197 | 12/1986 | DeFreese et al. | 427/10 |
| 4,758,686 | 7/1988 | Takahashi et al. | 174/35 MS |
| 4,760,456 | 7/1988 | Liang | 358/245 |
| 4,779,031 | 10/1988 | Arends et al. | 318/565 |
| 4,782,320 | 11/1988 | Shier | 338/295 |
| 4,838,475 | 6/1989 | Mullins et al. | 228/179 |
| 4,896,001 | 1/1990 | Pitts et al. | 174/35 M |

OTHER PUBLICATIONS

Schulz et al., Shielding Theory and Practice, Aug. 1988, IEEE Transactions on Electromagnetic Compatibility, vol. 30, No. 3.
Tecknit, EMI Shielding Design Guide, ©1982, pp. 2-1, and 3-1 thru 3-5.

Primary Examiner—Leo P. Picard
Assistant Examiner—Bot Lee Ledynh
Attorney, Agent, or Firm—Daniel R. Collopy; William E. Koch; Vincent B. Ingrassia

[57] ABSTRACT

A housing (100), that is suitable for use in a automated manufacturing and/or testing environment, is constructed and arranged to substantially enclose and shield a trimmable electrical circuit (107) from radio frequency interference external to the housing (100). At least a portion of the housing (100) is constructed and arranged to shield while contemporaneously allowing a laser beam (114) to pass therethrough so as to focus on at least a portion of the trimmable electrical circuit (107) and thereby laser trim the trimmable electrical circuit (107).

10 Claims, 3 Drawing Sheets

INTERFERENCE SHIELD SUITABLE FOR USE IN AUTOMATED MANUFACTURING ENVIRONMENT

FIELD OF THE INVENTION

This invention relates in general to the field of enclosures suitable for use in an automated or semi-automated manufacturing and/or testing environment for shielding against radio frequency interference (RFI), and more specifically to those RFI shielding enclosures that facilitate automated adjustments of internal devices.

BACKGROUND OF THE INVENTION

The manufacturing of many modern communication devices (e.g., selective call receivers), typically requires tuning an electrical circuit while measuring the radio frequency characteristics of the circuit. The tuning process is necessarily performed in substantial isolation of the external radio frequency interference (RFI) (i.e. electromagnetic interference (EMI)) commonly found in contemporary production environments. Typically, a radio frequency shielding enclosure is constructed with a hinged door which facilitates ingress and egress of the electrical circuit, while maintaining substantial isolation from the external RFI when the door is closed. Radio frequency sensors are commonly located within the RFI shielding enclosure and connected to external measurement equipment via shielded cables that typically connect through the enclosure walls.

In modern automated factories, the tuning process in many instances requires automated laser trimming of a capacitor or other element, by selectively removing a portion of the capacitor plates to change the frequency characteristics of the electrical circuit. When the electrical circuit is located within a conventional RFI shielding enclosure it is impossible to laser trim the electrical circuit's components without forming an aperture in the shield, since the laser generator itself is a source of radio frequency interference and is normally located outside of the enclosure. However, while providing at least one aperture at the enclosure allows the ingress of the laser light, it also permits external radio frequency interference to contaminate the electrical circuit frequency measurements.

SUMMARY OF THE INVENTION

In carrying out one form of this invention, there is provided a housing suitable for use in an automated manufacturing and/or testing environment, constructed and arranged to substantially enclose and shield an electrical circuit from radio frequency interference external to the housing. The housing includes at least one portion being constructed and arranged to shield while contemporaneously allowing a laser beam to pass therethrough so as to focus on at least a portion of the electrical circuit.

DESCRIPTION OF A PREFERRED EMBODIMENT

Figure 1:
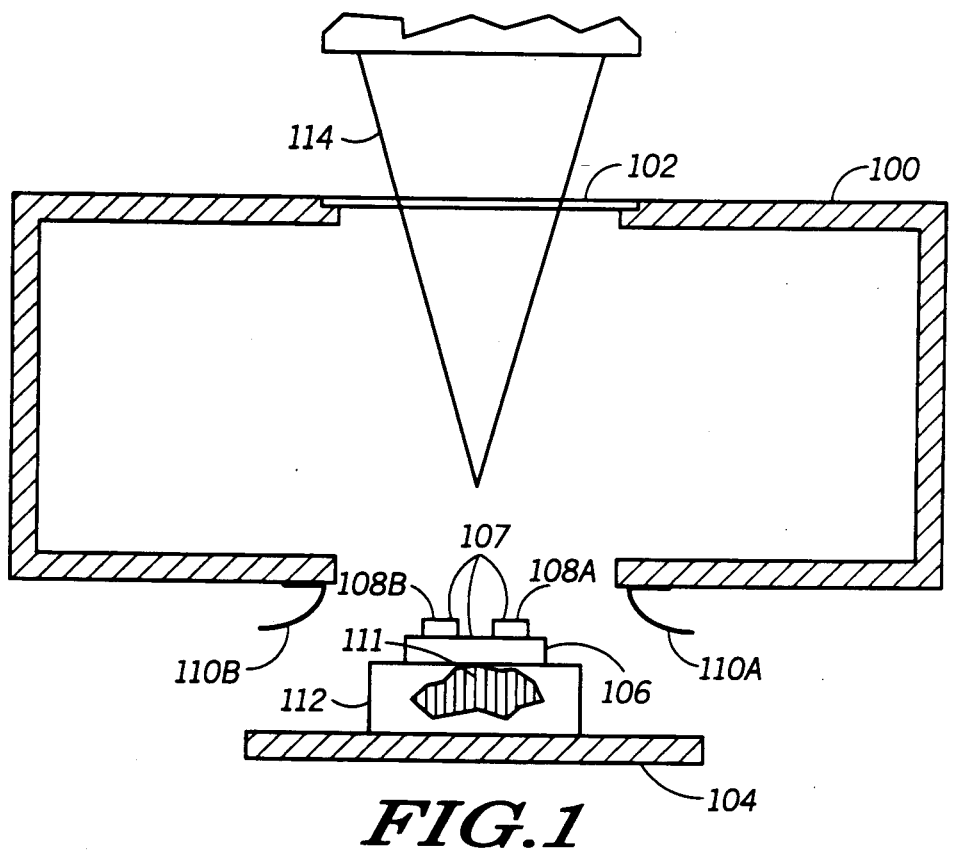
FIG. 1 is a cross-sectional side view of an RFI shielding enclosure according to one embodiment of the present invention.

Referring to FIG. 1, a cross-sectional side view of a radio frequency interference (RFI), i.e. an electromagnetic interference (EMI), shielding enclosure is shown, in accordance with an embodiment of the present invention. The enclosure 100 may be constructed of any suitable RFI shielding material, such as aluminum or copper. A screen mesh 102, also preferably constructed of aluminum or copper, is coupled to the enclosure 100 to provide an RFI shield that permits light (such as laser light) into the enclosure 100 without permitting the ingress of RFI. In an automated production line, a conventional conveyor belt (not shown) moves a pallet 104, which is preferably made of aluminum, and positions the pallet 104 in alignment with an aperture in the enclosure 100. A conventional lift mechanism (not shown) raises the pallet 104 and locates a circuit supporting substrate 106 and electrical components thereon (108A and 108B shown), which compose a portion of an electrical circuit 107, within the RFI shielding enclosure 100 for a laser trimming operation. Preferably, conductive fingers 110A and 110B electrically couple to the pallet 104 and form a conductive RFI seal between the pallet 104 and the enclosure 100. However, other forms of conductive sealing (e.g. conductive elastomer), between the pallet 104 and the enclosure 100 may be used. Thus, external radio frequency interference is substantially attenuated by the screen mesh 102 as well as the pallet 104 and enclosure 100 RFI seal to permit effective and reliable measurement of the radio frequency characteristics of the electrical circuit 107. The measurements may be effected preferably via conventional probe pins 111 which may rise from a supporting nest 112 and electrically couple to the electrical circuit 107. Alternately, conventional electromagnetic sensors (not shown) within the enclosure 100 may sense the radio frequency characteristics of the electrical circuit 107.

Once the electrical circuit 107 is secured within the RFI shielding enclosure 100, a laser beam 114 may be focused onto the respective electrical component 108B to perform the laser trimming operation in essential isolation of the external RFI. According to the invention, most of the laser energy passes through the screen mesh 102 and focuses on the electrical component 108B, as will be subsequently more fully discussed.

Figure 2:
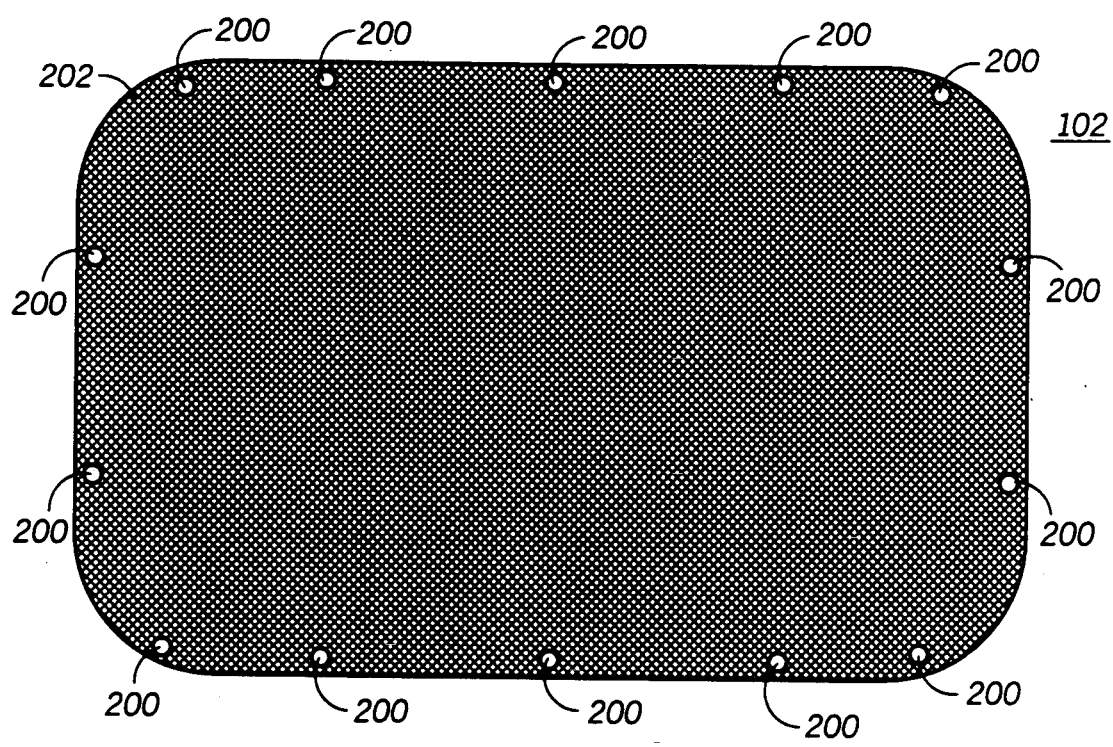
FIG. 2 is a top view of the screen mesh in FIG. 1.

Referring to FIG. 2, a top view of the screen mesh 102 illustrates the preferred construction. Preferably, a series of openings 200 about the periphery of the screen mesh 102 allow fasteners (not shown) to secure the screen mesh 102 to the RFI shielding enclosure 100. The overall size of the electrical circuit 107 designated for laser trimming determines the overall screen mesh 102 dimensions (i.e. for a communication device such as a selective call receiver the screen mesh 102 may be constructed with rectangular dimensions of approximately two inches by four inches).

The screen mesh 102 comprises many individual cells 202 (i.e., apertures), that are dimensioned to optimally permit the ingress of the laser energy into the enclosure 100, while effectively shielding the electrical circuit 107 measurements from external RFI. The ratio of cell opening 202 to conductive screen mesh 102 cross-sectional area depends mainly on the required attenuation of radio frequency interference energy at the frequencies of interest. For example, a copper screen mesh 102 may be constructed with 21 by 21 conductors per square inch and a conductor diameter of approximately 0.010 of an inch. The cell opening 202 to conductor cross-sectional area ratio in this case would approximate 64%, (i.e., $(0.04)^2/(0.01+0.04)^2$). Therefore, the attenuation of a 931 megahertz (MHz) exemplary external radio frequency interference was measured at approximately 82 decibels (dB) within the enclosure 100 and associated two inch by four inch screen mesh 102, following the aforementioned construction and arrangement. This attenuation is more than adequate for discriminating between the electrical circuit's 107 frequency characteristics and the external radio frequency interference.

Moreover, the laser beam 114 may be readily focused onto one of the electrical components, for example electrical component 108B, to perform the laser trimming operation with adequate transmission of laser energy through the screen mesh 102. The 64% ratio of cell opening to conductor cross-sectional area permits substantial laser light 114, which is unfocused at the screen mesh 102, to pass and focus onto the electrical circuit 107 below. The loss of laser power due to the screen mesh 102 may be surmounted by slightly increasing the laser power setting at a generator (not shown). This adjustment is commonly available in industrial laser beam generators. Therefore, this invention accomplishes the laser trimming operation on the electrical circuit 107 within the RFI shielding enclosure 100.

Figure 3:
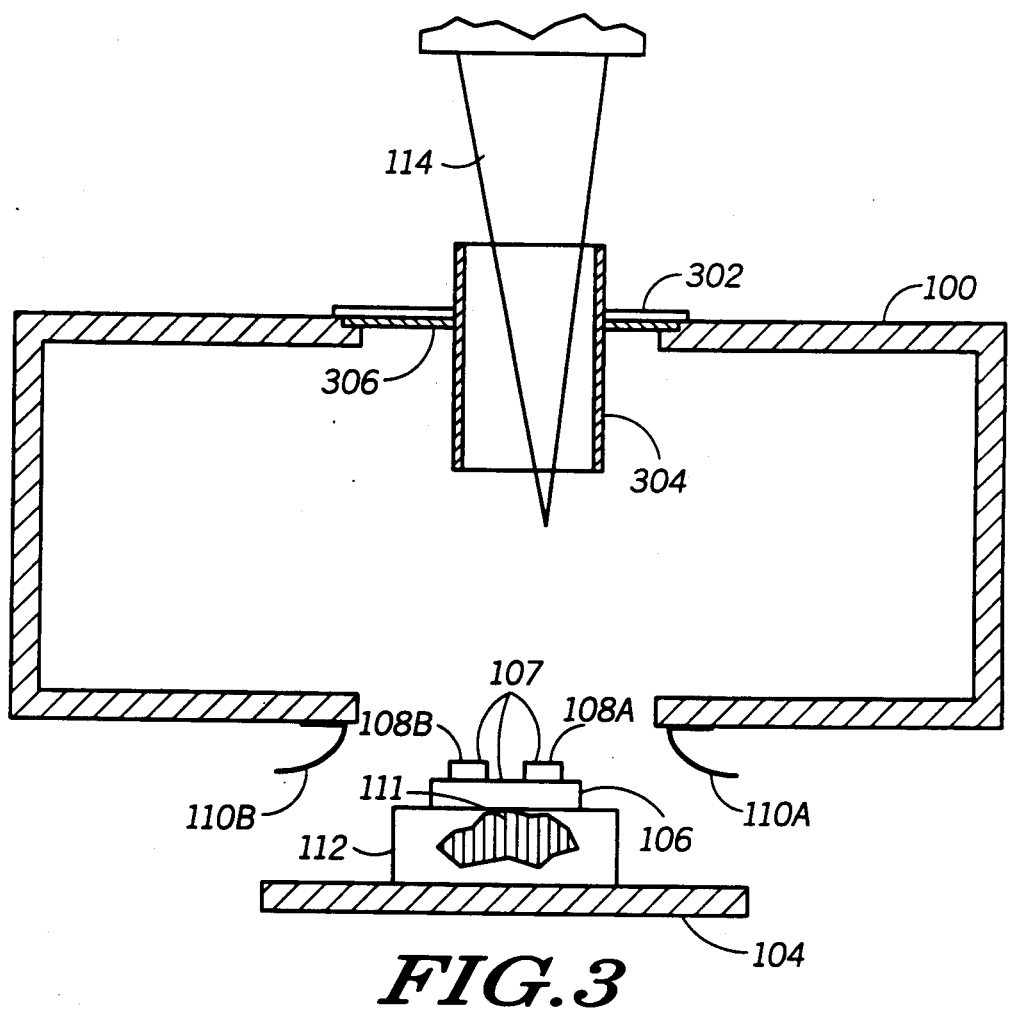
FIG. 3 is a cross-sectional side view of an RFI shielding enclosure according to an alternate embodiment of the present invention.

Referring to FIG. 3, a cross-sectional side view of the RFI shielding enclosure 100 is shown, in accordance with an alternate embodiment of the present invention. The screen mesh 302 is constructed in similar fashion to the previous embodiment, preferably from a conductive material such as copper or aluminum. Additionally, a channel 304 (i.e., a waveguide), may be constructed from similar conductive material and electrically coupled to the screen mesh 302. Optionally, a supporting plate 306, constructed from similar conductive material, may serve to provide physical support for the channel 304 and the screen mesh 302. The channel 304 dimensions substantially permit unattenuated laser light beam 114 into the enclosure 100 for the laser trimming operation, while essentially shielding against the external radio frequency interference, as will be more fully discussed below.

The main advantage of using the channel 304 (i.e., the waveguide), in this embodiment, is the ability to focus the full energy of the laser beam 114 onto the electrical circuit 107 without transmission loss due to the screen mesh 302. The screen mesh 302, however, provides optional visibility into the RFI shielding enclosure 100, which is useful in locating the electrical circuit 107 for the laser trimming and other operations.

The geometric dimensions of the channel 304 for passing the laser light beam 114 are dictated chiefly by the area on the circuit supporting substrate 106 requiring laser trimming and the shielding effectiveness required against the external RFI. The larger the channel 304 cross-sectional area required to direct the laser light beam 114 onto the electrical circuit 107 the longer the channel may need to be dimensioned to sufficiently attenuate unwanted external RFI from the tuning measurements. Therefore, the electrical components 108A and 108B may best be located in close proximity on the circuit supporting substrate 106 to optimally reduce the necessary channel 304 dimensions. An exemplary computation of the channel 304 dimensions is discussed below.

Figure 4:
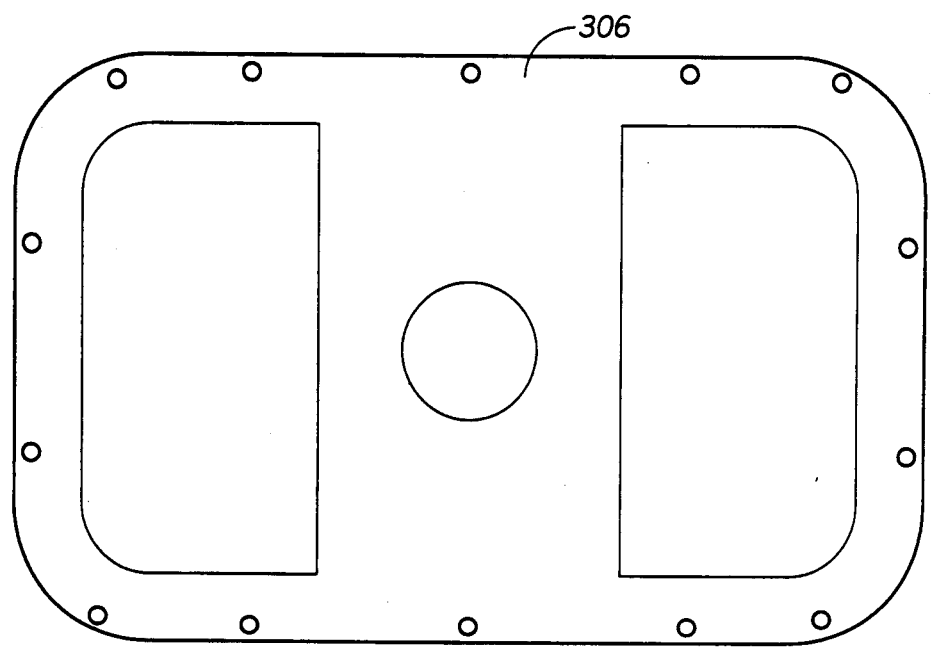
FIG. 4 is a top view of a supporting plate used in FIG. 3.
Figure 5:
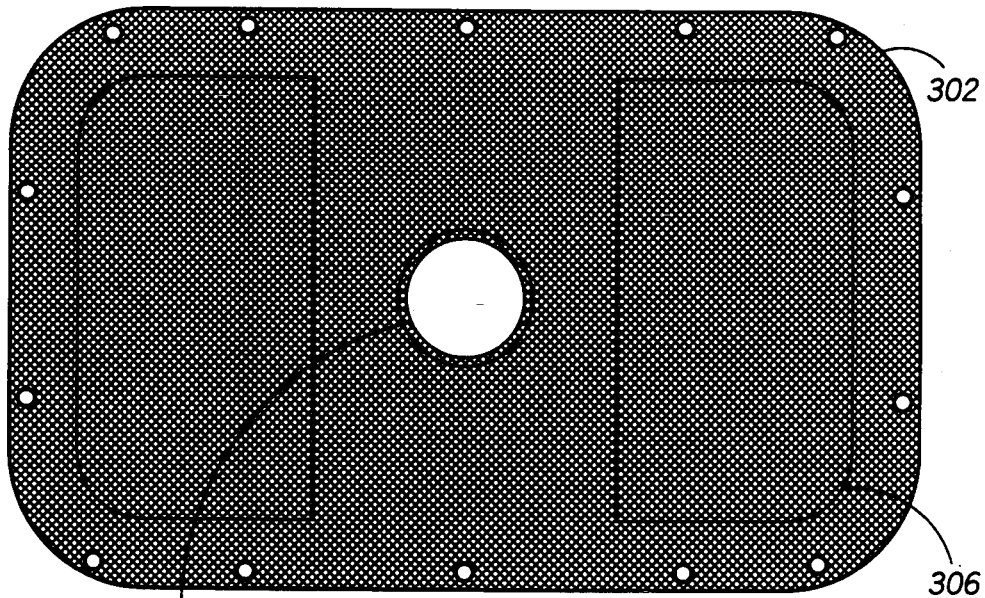
FIG. 5 is a top view of the screen mesh, supporting plate, and channel of FIG. 3.
Figure 6:
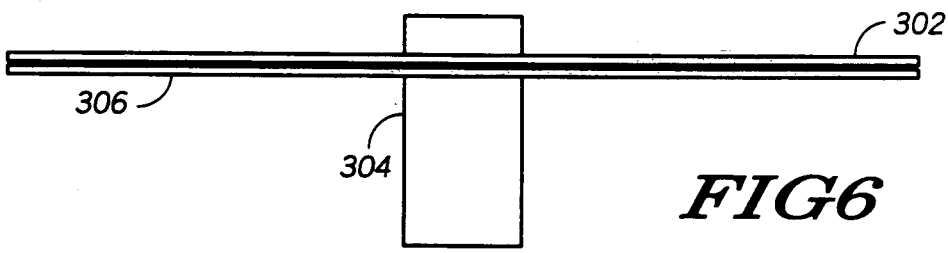
FIG. 6 is a side view of the screen mesh, supporting plate, and channel of FIG. 3.

Referring to FIGS. 4, 5, and 6, two top views and one side view, respectively, illustrate the supporting plate 306, screen mesh 302, and channel 304 construction and arrangement, in accordance with this embodiment of the present invention. The exemplary channel 304 (i.e., waveguide) is constructed with cylindrical dimensions. The screen mesh 302 electrically couples with the conductive channel 304 (both being constructed from conductive material such as copper). Optional supporting plate 306, constructed from a conductive material such as copper or aluminum, may be included to add structural support to the screen mesh 302, as may be necessary to physically support the channel 304.

The dimensions for the cylindrical channel 304 may be computed by starting with the dimensions of the area on the circuit supporting substrate 106 designated for laser trimming. In this example, the cross-sectional area of the cylindrical channel 304 (i.e., the cylindrical waveguide), is selected with a diameter of 1.5 inches. This dimension then dictates the length of the cylindrical channel 304 necessary to sufficiently attenuate the unwanted external RFI at the electrical circuit 107 radio frequency measurements.

A formula that may be used to calculate the required length of the cylindrical waveguide is:

$$SE_{dB} = R_{dB} + A_{dB}$$

where:

$SE_{dB}$ is the shielding effectiveness in decibels (dB). This value represents the desired attenuation of the unwanted external RFI.

$R_{dB}$ is the reflection loss in dB from surfaces on the waveguide.

$A_{dB}$ is the penetration or absorption loss in dB inside the conductive walls of the waveguide.

The absorption loss term in the formula may be approximated by:

$$A_{dB} = 32(l/d)$$

where:
d = the diameter of the cylindrical waveguide; and
l = the length of the waveguide The reflection loss term in the formula may be approximated by:

$$R_{dB} = 20 \log_{10}(f_c/f)$$

where:

$f_c$ = the cut-off frequency of the waveguide, which is a function of twice the diameter of the waveguide.
    = $1.76 \times 10^{10}/d$ (in centimeters)
    = $6.92 \times 10^9/d$ (in inches); and f = the frequency of the unwanted external RFI to be attenuated.

These approximations are possible when $f \leq f_c/10$. That is, when the unwanted external RFI frequency is in the range of one tenth the cutoff frequency for the waveguide the simplifying formulas may be applied.

Therefore, in the exemplary cylindrical channel 304 (i.e., waveguide), given a diameter of 1.5 inches, the length may be selected to attenuate a 931 MHz RFI signal by approximately 70 dB, as follows:

$$SEdB = 20 \log_{10}(f_c/f) + 32(l/d)$$

$$70 \text{ dB} = 20 \log_{10}((6.92 \times 10^9/d)/f) + 32(l/d)$$

$$70 = 20 \log_{10}((6.92 \times 10^9/1.5)/931 \times 10^6) + 32(l/1.5)$$

Solving for the length (l) in the formula suggests that approximately 3.0 inches may be sufficient for the required shielding effectiveness. The dimensions for the exemplary channel 304, therefore, may be selected in this case with the approximate diameter of 1.5 inches and the approximate length of 3.0 inches.

Although a cylindrical channel 304 was discussed above, it may be evident to one with common skill in the art that alternate dimensions for the channel 304 are feasible (e.g. a rectangular cross-section), within the spirit of the present invention.

What is claimed is:

1. An apparatus suitable for use in an automated manufacturing and/or testing environment, comprising:
   a housing constructed and arranged to substantially enclose and shield a trimmable electrical circuit from radio frequency interference external to the housing, the housing including at least one portion thereof being constructed and arranged to shield while contemporaneously allowing a laser beam to pass therethrough so as to focus on at least a portion of the trimmable electrical circuit and thereby laser trim the trimmable electrical circuit; and
   sensing means substantially enclosed within the housing for sensing a radio frequency signal emitted from the trimmable electrical circuit, thereby capable of measuring the frequency characteristics of the trimmable electrical circuit while contemporaneously performing a laser trimming operation.

2. The apparatus of claim 1, wherein the housing includes a shielding screen mesh that allows the laser beam into the housing and to focus onto the trimmable electrical circuit while substantially shielding the trimmable electrical circuit from radio frequency interference external to the housing.

3. The apparatus of claim 1, wherein the housing includes a wave-guide of geometric dimensions and orientation to allow the substantially unattenuated laser beam into the housing and to focus onto the trimmable electrical circuit while substantially shielding the trimmable electrical circuit from radio frequency interference external to the housing.

4. The apparatus of claim 1, further comprising a selectively separable housing member to facilitate ingress and egress of the electrical circuit, such that the trimmable electrical circuit is substantially shielded from radio frequency interference external to the housing when enclosed within the housing.

5. An apparatus suitable for use in an automated manufacturing and/or testing environment, comprising:
   a housing constructed and arranged to substantially enclose and shield a trimmable electrical circuit from radio frequency interference external to the housing, the housing including a wave-guide of geometric dimensions and orientation to allow a laser beam to pass substantially unattenuated therethrough so as to focus on at least a portion of the trimmable electrical circuit to perform a laser trimming operation while substantially shielding the trimmable electrical circuit from radio frequency interference external to the housing.

6. The apparatus of claim 5, further comprising a selectively separable housing member to facilitate ingress and egress of the electrical trimmable circuit, such that the trimmable electrical circuit is substantially shielded from radio frequency interference external to the housing when enclosed within the housing.

7. An apparatus suitable for use in an automated manufacturing and/or testing environment, comprising:
   a housing constructed and arranged to substantially enclose and shield a trimmable electrical circuit from radio frequency interference external to the housing, the housing including at least one portion thereof being constructed and arranged to substantially attenuate the external radio frequency interference while contemporaneously allowing a laser beam to pass therethrough so as to focus on at least a portion of the trimmable electrical circuit and thereby laser trim the trimmable electrical circuit; and sensing means substantially enclosed within the housing for sensing a radio frequency signal emitted from the trimmable electrical circuit, thereby capable of measuring the frequency characteristics of the trimmable electrical circuit while contemporaneously performing a laser trimming operation.

8. The apparatus of claim 7, wherein the housing includes a shielding screen mesh that allows the laser beam into the housing and to focus onto the trimmable electrical circuit while substantially attenuating the external radio frequency interference within the housing.

9. The apparatus of claim 7, wherein the housing includes a wave-guide of geometric dimensions and orientation to allow the substantially unattenuated laser beam into the housing and to focus onto the trimmable electrical circuit while substantially attenuating the external radio frequency interference within the housing.

10. The apparatus of claim 7, further comprising a selectively separable housing member to facilitate ingress and egress of the electrical trimmable circuit, such that the trimmable electrical circuit is substantially shielded from radio frequency interference external to the housing when enclosed within the housing.

* * * * *

UNITED STATES PATENT AND TRADEMARK OFFICE
CERTIFICATE OF CORRECTION

PATENT NO. : 5,055,651

DATED : October 8, 1991

INVENTOR(S) : Robert B. Schneider, et. al.

It is certified that error appears in the above-identified patent and that said Letters Patent is hereby corrected as shown below:

Claim 6, column 6, line 18 delete "electrical trimmable" and insert therefor --trimmable electrical--.

Claim 10, column 6, line 55 delete "electrical trimmable" and insert therefor --trimmable electrical--.

Signed and Sealed this

Twenty-ninth Day of December, 1992

Attest:

DOUGLAS B. COMER

*Attesting Officer*   *Acting Commissioner of Patents and Trademarks*